(12) United States Patent
Kotzab

(10) Patent No.: US 6,280,665 B1
(45) Date of Patent: Aug. 28, 2001

(54) METHOD OF INJECTION OR DIECASTING MOLD TEMPERATURE CONTROL

(76) Inventor: Werner Kotzab, Paul-Klee-Strasse 16, D-97422 Schweinfurt (DE)

( * ) Notice: Subject to any disclaimer, the term of this patent is extended or adjusted under 35 U.S.C. 154(b) by 0 days.

(21) Appl. No.: 09/188,170

(22) Filed: Nov. 9, 1998

(30) Foreign Application Priority Data

Nov. 8, 1997 (DE) .............................................. 197 49 495

(51) Int. Cl.⁷ .................................................. B29C 45/73
(52) U.S. Cl. .................................. 264/40.6; 264/328.16; 425/144
(58) Field of Search ............................. 264/40.6, 328.14, 264/328.15, 328.16, 319; 425/143, 144, 552; 364/475.07; 700/202, 205

(56) References Cited

U.S. PATENT DOCUMENTS

| | | | |
|---|---|---|---|
| 3,583,467 | * 6/1971 | Bennett | 425/144 |
| 4,420,446 | * 12/1983 | Wieder et al. | 264/40.6 |
| 5,135,688 | * 8/1992 | Nakamura et al. | 264/40.6 |
| 5,376,317 | * 12/1994 | Maus et al. | 264/40.6 |
| 5,411,686 | * 5/1995 | Hata | 264/40.6 |
| 5,452,999 | * 9/1995 | Evans | 425/144 |
| 5,772,933 | * 6/1998 | Kotzab | 264/40.6 |

FOREIGN PATENT DOCUMENTS

| | | |
|---|---|---|
| 3027986 | 2/1982 | (DE) . |
| 3636936 | 5/1988 | (DE) . |
| 4307347 | 9/1994 | (DE) . |
| 4444092 | 4/1996 | (DE) . |
| 29621968 | 3/1997 | (DE) . |

OTHER PUBLICATIONS

Seidel, "ZweckmaBiges Heizen und Kuhlen von Drunkgiessformen mit entsprechenden Temperaturregelgeraten" *Giesserei*, 60:794–799, (1973).

* cited by examiner

*Primary Examiner*—Jill L. Heitbrink
(74) *Attorney, Agent, or Firm*—Browdy and Neimark

(57) ABSTRACT

In a method of controlling the temperature of an injection or diecasting mold, the respective temperature of the mold being detected by at least one sensor and compared to a set point and coolant, in particular cooling water, being metered and added through cooling channels disposed in the mold in dependence on detected overshooting or undershooting of the set point, it is provided, with a view to avoiding any overswinging of the control, that opening the valves for metering the coolant is allocated to one threshold and closing the valves to the other.

4 Claims, 2 Drawing Sheets

METHOD OF INJECTION OR DIECASTING MOLD TEMPERATURE CONTROL

BACKGROUND OF THE INVENTION

1. Field of the Invention

The invention relates to a method of controlling the temperature of an injection or diecasting mold, the respective temperature of the mold being detected by at lot one sensor and compared to a set point and coolant in particular cooling water, being metered and added through cooling channels disposed in the mold in dependence on any detected overshooting or undershooting of the set point.

2. Background Art

A known method of the generic type is described in U.S. Pat. Nos. 4,354,812 and 4,420,446, coolant pulses being generated, based on a determined average temperature. The drawback of this method resides in that temperature correction can be realized only after several cycles when the conditions in the mold change, such as the pressure or the temperature of the coolant.

In another known method according to German patent 43 09 890, a cooling pulse is emitted at the beginning of the injection cycle and a plurality of cooling pulses are emitted at the end of the injection cycle, based on averaging. This method, too, is accompanied with the drawback mentioned above, the coolant pulses initiated at the end of the cycle having especially negative effects, because They entail an increased heat flow at the end of the cycle, the result of which is the occurrence of cold zones on the surface of the cavity in the vicinity of the cooling channels at the back of it. The melt then encounters a surface of varying temperatures, which forcibly conditions distortion of the product and other lacks of quality. Comparable methods are also described in U.S. Pat. Nos. 5,452,999 and 5,589,114.

Further known prior art teaches an injection mold with three sensors. A sensor in the core is disposed in the wall of the mold directly before the surface of the cavity. This is where a temperature rise is detected after the injection of the hot material to be injected and a short-term decrease after a coolant pulse. However, a renewed temperature rise occurs thereafter, conditioned by the heat entering from outside. Correspondingly, this known method must provide for double cooling each time the adjusted temperature set point is exceeded. This can result in that the temperature of the mold surface decreases clearly below the adjusted temperature set point, reaching the set point necessary for optimum processing only after one or several cycles. This process can recur periodically. In this known method, a second sensor is disposed close to the sprue which is again disposed very close to the cavity. During the regulating process at the same pre-set temperature, the situation arises that the sensor records a temperature rise and triggers the valve to open when the pre-set temperature is reached or exceeded so that a coolant pulse is emitted, the valve closing only when is temperature is no longer reached. Since the corresponding cooling channel may possibly be disposed far away, the heat transfer from the cooling channel to the sensor cannot be synchronous to the cycle, as a result of which the heat extraction by the cooling pulse is noticed too late and as a result of which there is again strong falling short of the pre-set temperature so that the pre-set temperature is reached only after several cycles.

SUMMARY OF THE INVENTION

It is an object of the invention to specify a method which avoids any such strong over- or undershooting of the temperature relative to the pre-set temperature.

According to the invention, this object is attained in that, for regulation, two temperature thresholds are given as switching thresholds. Correspondingly, the temperature set point for the opening of the valve can be lower than the temperature set point for the closing of the valve or vice versa. Depending on how the cooling channels and the associated sensors are arranged in detail, both criteria may apply.

The method according to the invention has the advantage that any overshooting of the temperatures on the mold wall is avoided, it being possible nevertheless to apply a simple controlling algorithm, in which to intervene manually as well as automatically. Optimal temperature control is attained even in the case of very unfavorable conditions in the injection mold, for example in the case of especially high or low distances between the sensor and the cooling channels.

Details of the invention will become apparent from the ensuing explanation of a preferred embodiment, taken in conjunction with the drawing.

DESCRIPTION OF THE PREFERRED EMBODIMENT

Figure 1:
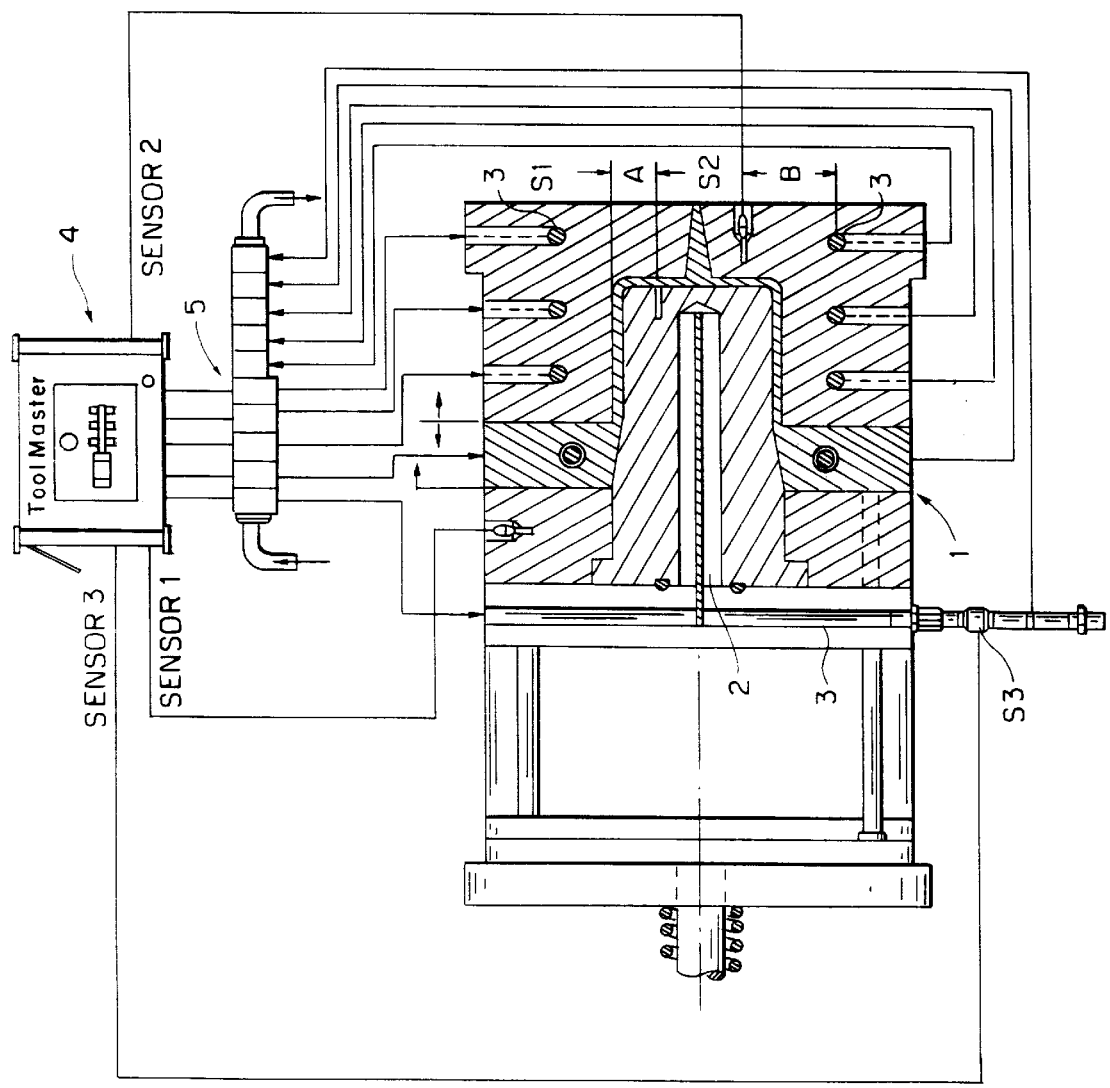
FIG. 1 is a diagrammatic illustration of injection mold having a temperature control system and three control loops each with a sensor S1, S2, S3.

FIG. 1 illustrates an injection mold 1 with a mold cavity 2 and a plurality of cooling channels 3.

A valve arrangement 5 for coolant that flows through the cooling channels is controlled via a control system 4.

A first sensor S1 is disposed at a distance A parallel to a cooling channel 3 and parallel to the mold cavity 2. A second sensor S2 is situated at a distance B from the cooling channels 3. A third sensor S3 is disposed in the cooling channel.

In prior art regulating systems as they have been described at the outset, the mentioned sensors pose the following problem:

Two temperature peaks are detected at the sensor S1, which result from two heat waves, a varying amount of heat being supplied in each case. The first temperature peak results from the vertical wall, whereas the second temperature peak results from the wall thickness which corresponds to the distance A. This second temperature increase is overrated by the sensor S1 in conventional methods, which leads to regulating errors.

At the sensor S2, the distance between the sensor S2 and the cooling channel 3 exceeds the heat transfer per cycle, as a result of which the sensor S2 records the heat dissipation due to the respective cooling pulse too late and the associated valve is correspondingly closed too late in conventional methods.

At the sensor S3 disposed in the cooling channel, the temperature increase is realized too late so that too much heat is dissipated per cycle according to the prior art, the temperature therefore decreasing below the pre-set temperature after the valve is closed.

Figure 2:
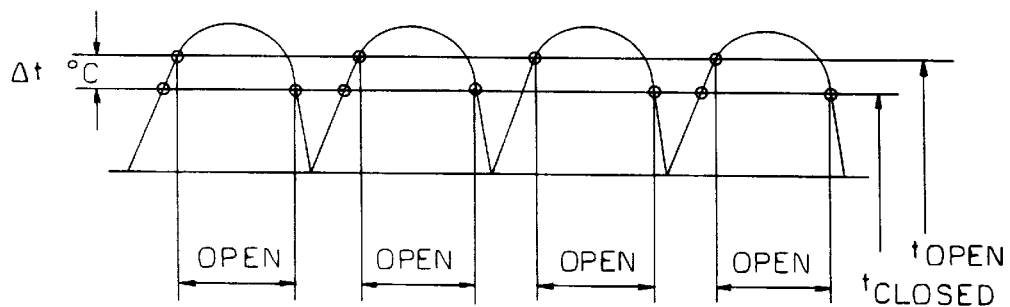
FIG. 2 is an illustration of the switching thresholds and the march of temperature at the sensor S2.

The method according to the invention avoids these drawbacks outlined above, which is described in the following with reference to FIGS. 2 to 4: FIG. 2 illustrates the march of temperature at the sensor S2. Two switching thresholds $t_{open}$ and $t_{closed}$ are provided, which are spaced apart by a temperature difference $\Delta t$, the overshooting of the upper switching threshold causing the valve of the respective cooling channel to open and the under-shooting of the lower switching threshold causing it to close. This results in a regulation adapted to the distance of the cooling channel, the distance $\Delta t$ being adjustable individually for each injection mold and each temperature sensor there provided.

Figure 3:
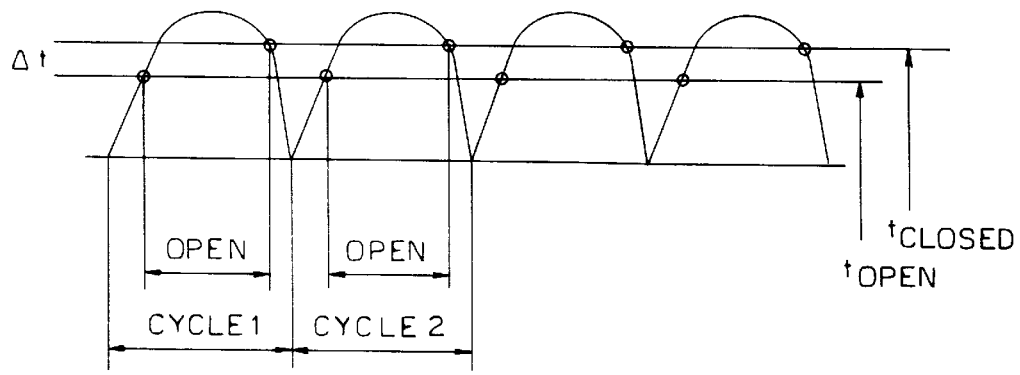
FIG. 3 is an illustration of the switching thresholds and the march of temperature at the sensor S3 which is disposed in the cooling channel.

FIG. 3 illustrates the march of temperature at the sensor S3 in the cooling channel 3. Again two switching thresholds $t_{open}$ and $t_{closed}$ of a distance $\Delta t$ are provided, however, in contrast to FIG. 2, the switching threshold $t_{open}$ responsible for the opening of the valve is lower than the switching threshold $t_{closed}$ responsible for the closing of the valve. Correspondingly, in this case, the respective valve of the valve arrangement 5 is opened early, cyclic heat dissipation being realized correspondingly.

Figure 4:
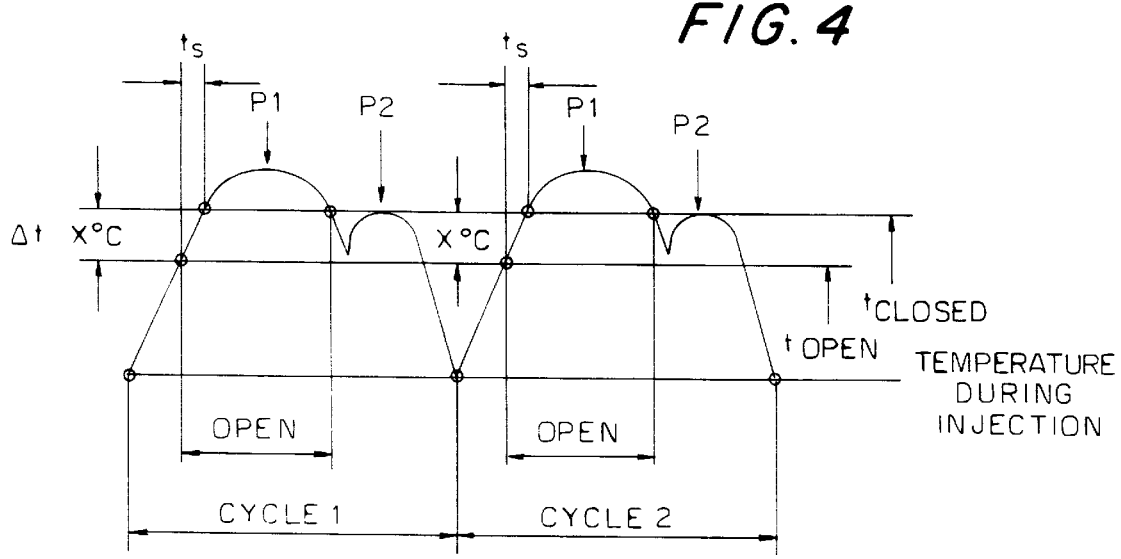
FIG. 4 is an illustration of switching thresholds and the march of temperature in the case of a sensor which, within an injection cycle, is actuated by a higher amount of heat and subsequently by a lower amount of heat, as can be observed for instance at the sensor S1.

FIG. 4 relates to the situation at the temperature sensor S1 where two temperature peaks P1 and P2 occur as mentioned. Again two switching thresholds are provided at a distance $\Delta t$. The lower switching threshold $t_{open}$ serves to open the valve, the higher switching threshold $t_{closed}$ serves to close the valve. Noticeably, the absolute heights and the distance between the temperature thresholds $t_{open}$ and $t_{closed}$ is chosen such that the second peak P2 does not lead to renewed opening and closing of the respective valve, any overshooting processes thus being avoided.

FIG. 4 illustrates an overture of the method according to the invention, in which the second switching threshold is not defined by the temperature absolute, but by the expiration of a fixed time interval $t_s$ after the first switching threshold is exceeded. This time interval can be preset in accordance with the individual range of application.

What is claimed is:

1. A method of controlling the temperature of an injection or diecasting mold, the respective temperature of the molding being detected by at least one sensor disposed in a cooling channel and compared to a set point and coolant being metered and added through cooling channels disposed in the mold in dependence on detected overshooting or undershooting of the set point, wherein, for regulation, two different temperature thresholds are preset so that opening the valves for metering the coolant is allocated to one threshold and closing the valve to the other threshold, wherein the temperature threshold $T_{closed}$ for closing the respective valve is above the temperature threshold $T_{open}$ for opening the valve.

2. A method according to claim 1, the sensor being disposed relative to the cooling channels and the mold cavity and the outer wall of the mold, respectively, such that successive temperature peaks of varying height are measured during an injection cycle, wherein the temperature thresholds have a distance $\Delta t$ and an absolute value referred to the respectively measured lower temperate peak P2 such that the temperature peak P2 is below the switching threshold $t_{closed}$ for the closing of the respective valve.

3. The method according to claim 1, wherein the coolant includes water.

4. A method of controlling the temperature of an injection or diecasting mold, the respective temperature of the mold being detected by at least one sensor and compared to a set point and coolant being metered and added through cooling channels disposed in the mold in dependence on detected overshooting or undershooting of the set point, wherein, for regulation, two different temperature thresholds are preset so that opening the valves for metering the coolant is allocated to one threshold and closing the valve to the other threshold, wherein a second of said temperature thresholds is given by being defined by a certain time interval, to be pre-set, after the overshooting or undershooting of a first of said temperature thresholds.

* * * * *